(12) United States Patent
He et al.

(10) Patent No.: US 11,992,889 B2
(45) Date of Patent: May 28, 2024

(54) METHOD FOR PREPARING A CROSS-SIZE MICRO-NANO STRUCTURE ARRAY

(71) Applicant: SOOCHOW UNIVERSITY, Suzhou (CN)

(72) Inventors: Haidong He, Suzhou (CN); Zijie Xi, Suzhou (CN); Chunju Wang, Suzhou (CN); Lining Sun, Suzhou (CN); Xuezhong Ning, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 394 days.

(21) Appl. No.: 17/605,552

(22) PCT Filed: Nov. 21, 2020

(86) PCT No.: PCT/CN2020/130684
§ 371 (c)(1),
(2) Date: Oct. 21, 2021

(87) PCT Pub. No.: WO2022/104757
PCT Pub. Date: May 27, 2022

(65) Prior Publication Data
US 2022/0339725 A1    Oct. 27, 2022

(30) Foreign Application Priority Data

Nov. 17, 2020 (CN) .......................... 202011284967.9

(51) Int. Cl.
*B23H 5/00* (2006.01)
*B23H 3/02* (2006.01)
(Continued)

(52) U.S. Cl.
CPC ................. *B23H 5/00* (2013.01); *B23H 3/02* (2013.01); *B23H 9/008* (2013.01);
(Continued)

(58) Field of Classification Search
CPC ........................... C25F 3/02–3/14; C25F 7/00;
B23H 2300/10; B23H 3/04; B23H 7/26;
B23H 7/38; B82Y 40/00; B23K 26/0604
See application file for complete search history.

(56) References Cited

FOREIGN PATENT DOCUMENTS

| CN | 101887203 A | 11/2010 |
|---|---|---|
| CN | 105081488 A * | 11/2015 |

(Continued)

OTHER PUBLICATIONS

Wang et al., Fabrication of Micro Annular Grooves on a Cylindrical Surface in Aluminum Alloys by Wire Electrochemical Micromachining, Int. J. Electrochem. Sci., 11 (2016) 7216-7229 (Jul. 7, 2016).

*Primary Examiner* — Nicholas A Smith
(74) *Attorney, Agent, or Firm* — SZDC Law PC

(57) ABSTRACT

A method for preparing a cross-dimension micro-nano structure array includes: S1. providing a workpiece immersed in the electrolyte as the first electrode, providing a trimming wire electrode as the second electrode and setting it above the workpiece, providing an interference beam adjuster and outputting multi-beam laser interference to irradiate the surface of the workpiece; S2. The power supply between the first electrode and the second electrode forms a loop, and drives the trimming wire electrode to reciprocate relative to the workpiece, and the workpiece undergoes electrochemical dissolution or electrochemical deposition at the corresponding position of the trimming wire electrode, and form a micro-nano structure array without a mask, and solves the problem of low output power of the existing ultrashort pulse power supply, improves the processing accuracy of the micro-nano structure array, does not require electrolyte for high-speed flow, and improves system safety and reduce the cost.

10 Claims, 5 Drawing Sheets

(51) Int. Cl.
*B23H 9/00* (2006.01)
*B23K 26/00* (2014.01)
*B23K 26/06* (2014.01)
*B23K 26/36* (2014.01)

(52) U.S. Cl.
CPC ...... *B23K 26/0093* (2013.01); *B23K 26/0604* (2013.01); *B23K 26/36* (2013.01); *B23H 2300/10* (2013.01)

(56) References Cited

FOREIGN PATENT DOCUMENTS

| | | | | | |
|---|---|---|---|---|---|
| CN | 106350847 | A | * | 1/2017 | ............ B82Y 40/00 |
| CN | 106350847 | A | | 1/2017 | |
| CN | 111299731 | A | * | 6/2020 | .............. B23H 3/02 |
| CN | 111299731 | A | | 6/2020 | |
| CN | 111702337 | A | | 9/2020 | |
| JP | H0491874 | A | | 3/1992 | |

* cited by examiner

METHOD FOR PREPARING A CROSS-SIZE MICRO-NANO STRUCTURE ARRAY

This application is National Phase Application of PCT/CN2020/130684, filed on Nov. 21, 2020, which claims the benefit of priority from the Chinese patent application No. 202011284967.9, filed on Nov. 17, 2020, which is incorporated herein by reference in its entirety.

FIELD OF THE INVENTION

The invention relates to a method for preparing a cross-size micro-nano structure array, belonging to the field of precision and micro-manufacturing.

BACKGROUND OF THE INVENTION

Precision and miniaturization are the mainstream development directions of modern industrial, civilian and military products. However, as the feature size of the device decreases, the surface forces that are usually ignored at the macro scale, such as van der Waals force, adhesive force, electrostatic force, and capillary force, have become the main factors restricting the normal operation of micro components or systems at the micro scale. In recent years, surface microtexturing technology, which uses micro-nano processing technology to construct a certain shape, size and arrangement of microstructure arrays on the surface of materials, has been fully proven to be used to control the surface properties of materials, thereby effectively improving the failure of micro-devices caused by surface or scale effects.

Metal-based micro-parts/components have the characteristics of high strength, low resistivity, high sensitivity, high density, and can achieve certain specific functions that traditional silicon-based micro devices cannot perform. The application demand of metal-based micro-parts/components in micro-electromechanical products has increased sharply. However, the traditional micro-nano processing technologies, such as micro-milling, laser processing, abrasive gas jet, EDM and mask electrochemical machining, etc., although they can be used for arrays of metal surface microstructures, they all have certain limitations. It is difficult to achieve the preparation of microstructure arrays with feature sizes below a few microns.

Compared with the other micro-nano processing methods mentioned above, the Mask Electrochemical Machining (TMECM) shows great advantages in processing surface quality (no burrs, no heat-affected zone, no recast layer, etc.). At the same time, due to the processing process, there is no mechanical contact stress and thermal stress can be used to achieve the processing of micro-texture on the surface of thin-walled metal parts. However, in the TMECM process flow, the fabrication of the mask is one of the essential key steps. When the characteristic parameters of the microstructure need to be changed, the mask must be remade, which not only causes a waste of materials, but also prolongs the process cycle. In addition, at this stage, the commonly used patterned photoresist or PDMS materials in TMECM exhibit hydrophobic characteristics. When the characteristic size of the pattern structure is reduced to about 10 microns, it is difficult to discharge the hydrogen bubbles generated by the processing in time. This suppresses the progress of electrochemical machining. The literature shows that the current minimum feature size of the microtexture prepared by the traditional TMECM is about 30 microns. In addition, since the dissolution of metal materials is isotropic during the electrochemical machining process, it is difficult to achieve the processing of the aspect ratio micro-texture using TMECM. At the same time, when the traditional TMECM prepares a large-area microtexture process, since the microstructure is formed at one time, a large amount of electrolysis products will be produced per unit time, which requires high-pressure and high-speed flow of the electrolyte, and timely renewal of the electrolyte in the machining gap. This brings certain safety hazards to processing.

Multi-beam laser interference processing technology is a special form of laser processing technology. The preparation of different types and sizes of micro textures can be achieved by changing the number of interference lasers and the laser incident angle. However, the essence of laser interference removal material is the same as that of traditional laser processing, so the processed surface is in the heat-affected zone, and the surface roughness is poor. At the same time, when large-area micro-texture preparation is performed, since the laser energy density is required to exceed the strong ablation threshold of the material, the laser is required to have a large output power and the equipment cost is relatively high.

The ultra-short pulse micro electrochemical machining technology uses the charge and discharge material of the electric double layer on the electrode surface under the action of pulse voltage, so that the electrochemical machining accuracy is improved from tens of micrometers to submicrometers or even nanometers. However, due to the limitation of the output power of the ultrashort pulse power supply, this technology still cannot be directly used for the processing of large-area microstructures.

SUMMARY OF THE INVENTION

The object of the invention is to provide a method for preparing a cross-size micro-nano structure array, which does not require a mask, uses a trimming wire electrode as a tool electrode, and does not require electrolyte to flow at a high speed, and achieves the preparation of a large-area micro-nano structure array.

In order to achieve the above objectives, the invention provides the following technical solutions: A method for preparing a cross-size micro-nano structure array, includes:
  S1. Providing a workpiece immersed in the electrolyte as the first electrode, providing a trimming wire electrode as the second electrode and setting it above the workpiece, providing an interference beam adjuster and outputting multi-beam laser interference to irradiate the surface of the workpiece;
  S2. The power supply between the first electrode and the second electrode forms a loop, and drives the trimming wire electrode to reciprocate relative to the workpiece, and the workpiece undergoes electrochemical dissolution or electrochemical deposition at the corresponding position of the trimming wire electrode, and form a micro-nano structure array.

In an exemplary embodiment, the period of the micro-nano structure array is 100 nm-10 μm.

In an exemplary embodiment, the multi-beam laser interference is any one of two-beam interference, three-beam interference, and four-beam interference.

In an exemplary embodiment, the energy density of the light intensity region formed on the surface of the workpiece by the multi-beam laser interference is between the laser weak ablation energy density and the strong ablation energy density of the workpiece.

In an exemplary embodiment, in the S2, an ultrashort pulse power supply is used for power supply.

In an exemplary embodiment, the electrochemical parameters of the ultrashort pulse power supply are set so that the workpiece does not undergo electrochemical dissolution or electrochemical deposition; Under the multi-beam laser interference irradiation and the electrochemical parameters, the workpiece undergoes electrochemical dissolution or electrochemical deposition at the corresponding position of the trimming wire electrode.

In an exemplary embodiment, the preparation method of the trimming wire electrode is: providing a metal wire as a wire electrode, and the wire electrode is cut to a certain thickness along its axial direction by a micro-machining method to form the trimming wire electrode.

In an exemplary embodiment, the gap between the lower end surface of the trimming wire electrode and the upper surface of the workpiece is set to 1 μm as the initial machining gap, during the occurrence of the electrochemical dissolution, the distance between the trimming wire electrode and the workpiece remains unchanged, and during the occurrence of the electrochemical deposition, the trimming wire electrode moves far away from the workpiece at a constant speed v=0.01 μm.

The invention also provides a control system for preparing a cross-size micro-nano structure array, the method for preparing a cross-size micro-nano structure array according to above-mentioned method is used to process a workpiece set in the electrolyte, and the control system includes a trimming wire electrode set in the electrolyte, a power supply device electrically connected to the trimming wire electrode and the workpiece, and an interference beam regulator that provides multi-beam laser interference, and the power supply device forms a loop with the trimming wire electrode and the workpiece.

In an exemplary embodiment, the control system further comprises a motion platform that drives the trimming wire electrode to move relative to the workpiece.

The beneficial effect of the invention is:
1. The method for preparing a cross-size micro-nano structure array of the invention uses multi-beam laser interference to assist electrochemical dissolution or electrochemical deposition, and controls physical fields such as temperature field and electric field in a specific area on the surface of the material by using interference light field to control the electrochemical dissolution or electrochemical deposition speed of the workpiece material in this area, and combined with the high localization characteristics of ultrashort pulse electrochemical machining, achieves the preparation of large-area metal micro-nano structure arrays without masks.
2. The fine trimming wire electrode is used as the tool electrode, which solves the problem of low output power of the existing ultrashort pulse power supply. During the machining process, the trimming wire electrode removes or electrochemically deposits the workpiece material layer by layer in a reciprocating scanning motion, thereby improving the machining accuracy of the micro-nano structure array.
3. During the machining process, since there are few instantaneous electrochemical products, and the reciprocating movement of the trimming wire electrode has a certain disturbing effect on the electrolyte in the machining gap, the electrolysis products in the machining area can be discharged in time without high-speed flow of the electrolyte. Thereby ensuring the stability of either electrochemical dissolution or electrochemical deposition, improving system safety and reducing costs.
4. During the machining processing, the laser energy acting on the surface of the micro-nano structure by multi-beam laser interference is relatively strong, while the energy acting on the side surface is relatively weak. Therefore, it can be anisotropic electrochemical dissolution or electrochemical deposition to obtain a micro-nano structure array with a large aspect ratio and can achieve anisotropic electrochemical dissolution or electrochemical deposition of metal materials.
5. During electrochemical deposition, due to the action of laser, the compactness and bonding strength of the deposited layer can be effectively improved, thereby increasing the rigidity of the micro-nano structure with a large aspect ratio.

The above description is only an overview of the technical of the invention. In order to understand the technical of the invention more clearly and implement it in accordance with the content of the description, the preferred embodiments of the invention are described in detail below with accompanying drawings.

DETAILED DESCRIPTION OF THE INVENTION

The technical solutions of the invention will be clearly and completely described below in conjunction with the accompanying drawings. Obviously, the described embodiments are part of the embodiments of the invention, rather than all of the embodiments. Based on the embodiments of the invention, all other embodiments obtained by those of ordinary skill in the art without creative work shall fall within the protection scope of the invention.

In addition, the technical features involved in the different embodiments of the invention described below can be combined with each other as long as they do not conflict with each other.

Figure 1:
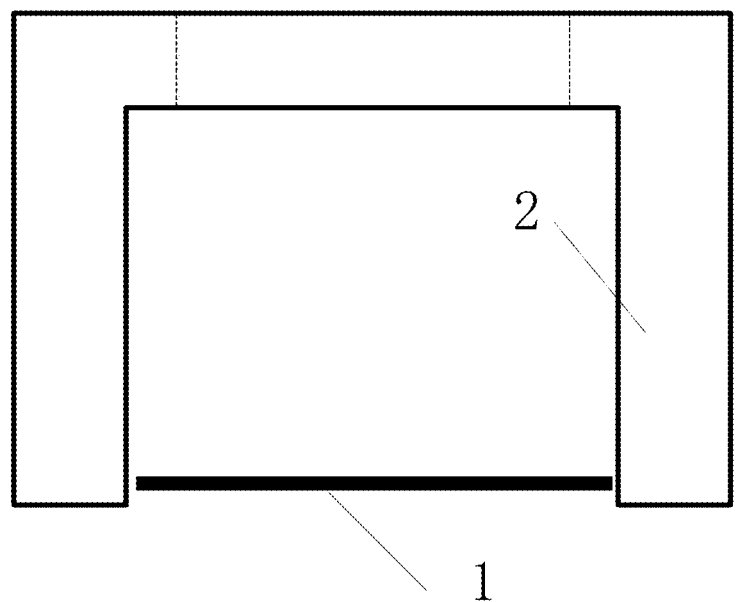
FIG. 1 shows a schematic diagram of the structure of the metal wire installed in the cathode fixture of the invention.
Figure 2:
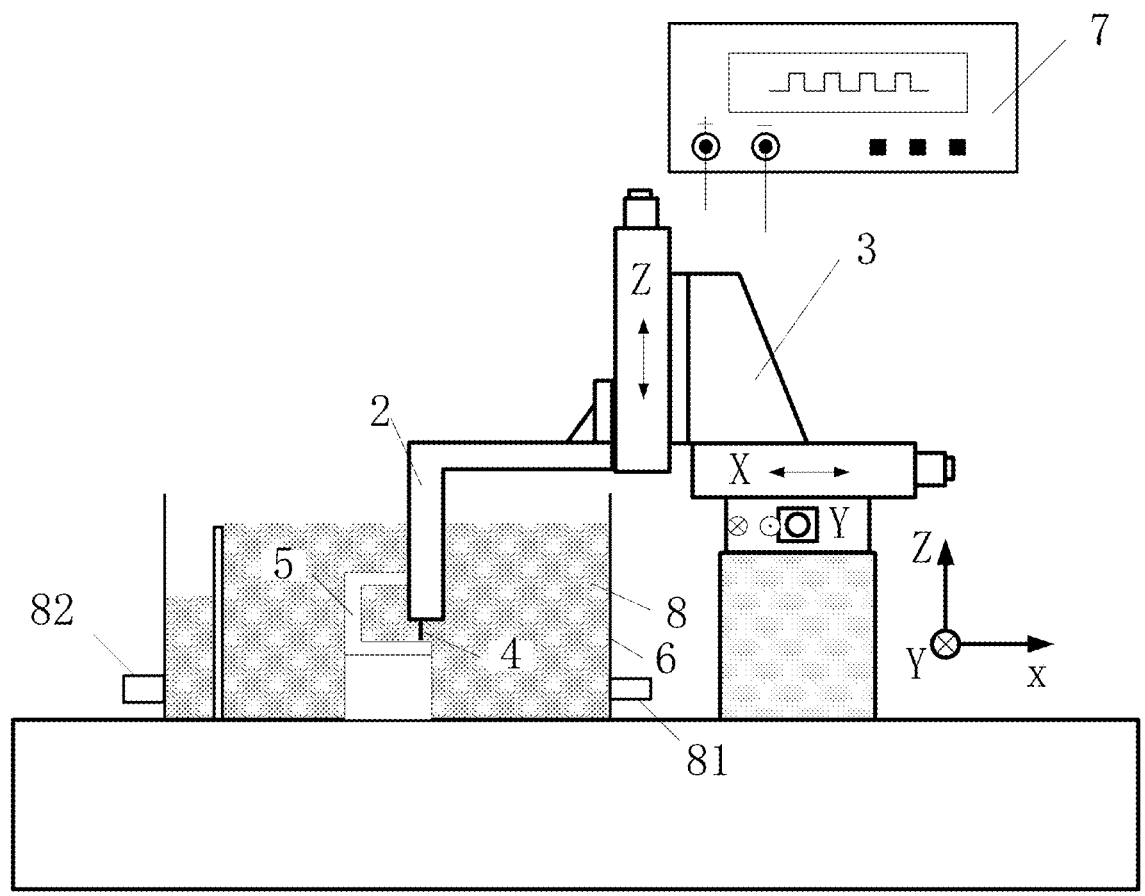
FIG. 2 shows a schematic diagram of the device for online preparation of trimming wire electrodes of the invention.
Figure 3:
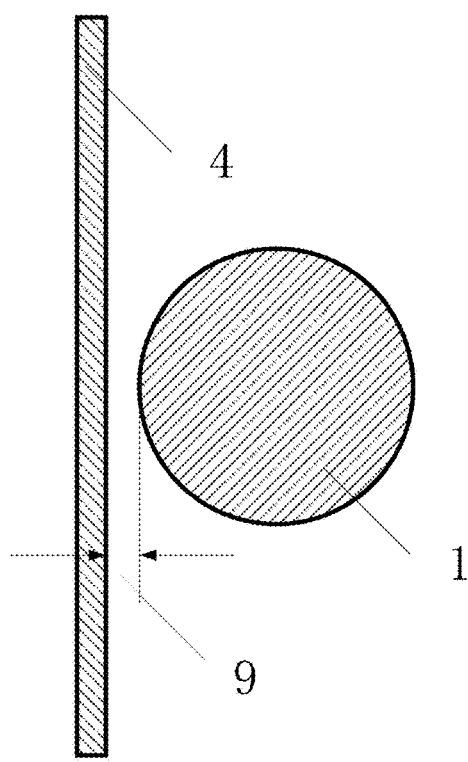
FIG. 3 shows a schematic diagram of the structure between the metal wire and the wire electrode of the invention.
Figure 4:
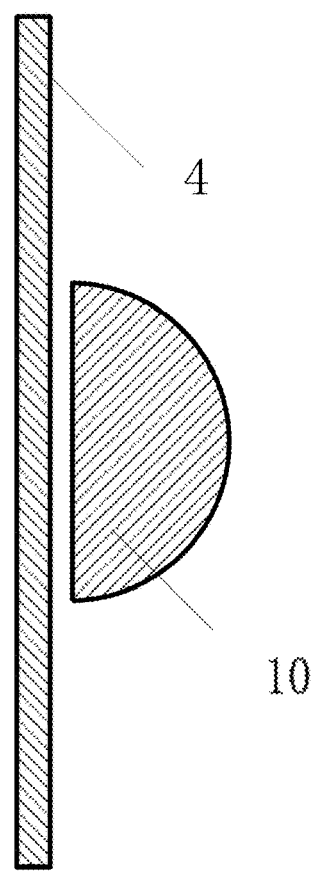
FIG. 4 shows a schematic diagram of the structure between the trimming wire electrode and the wire electrode of the invention.
Figure 5:
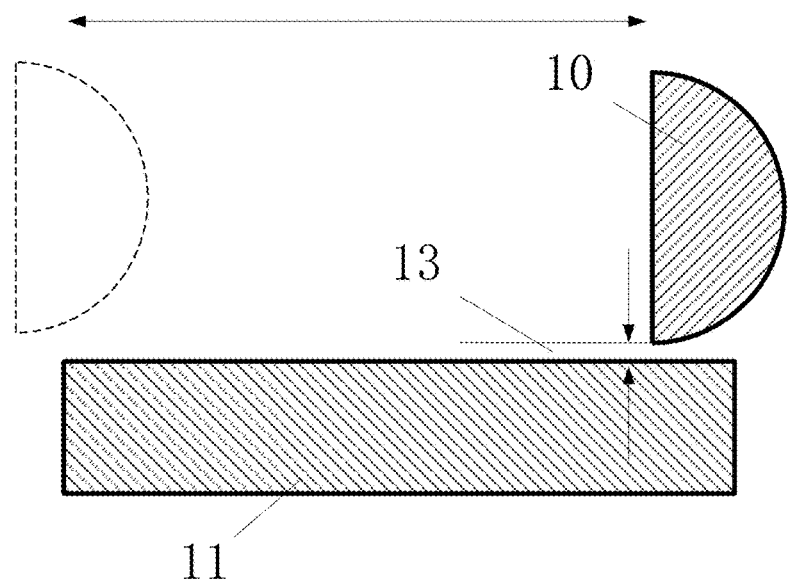
FIG. 5 shows a schematic diagram of the structure between the trimming wire electrode and the workpiece of the invention.
Figure 6:
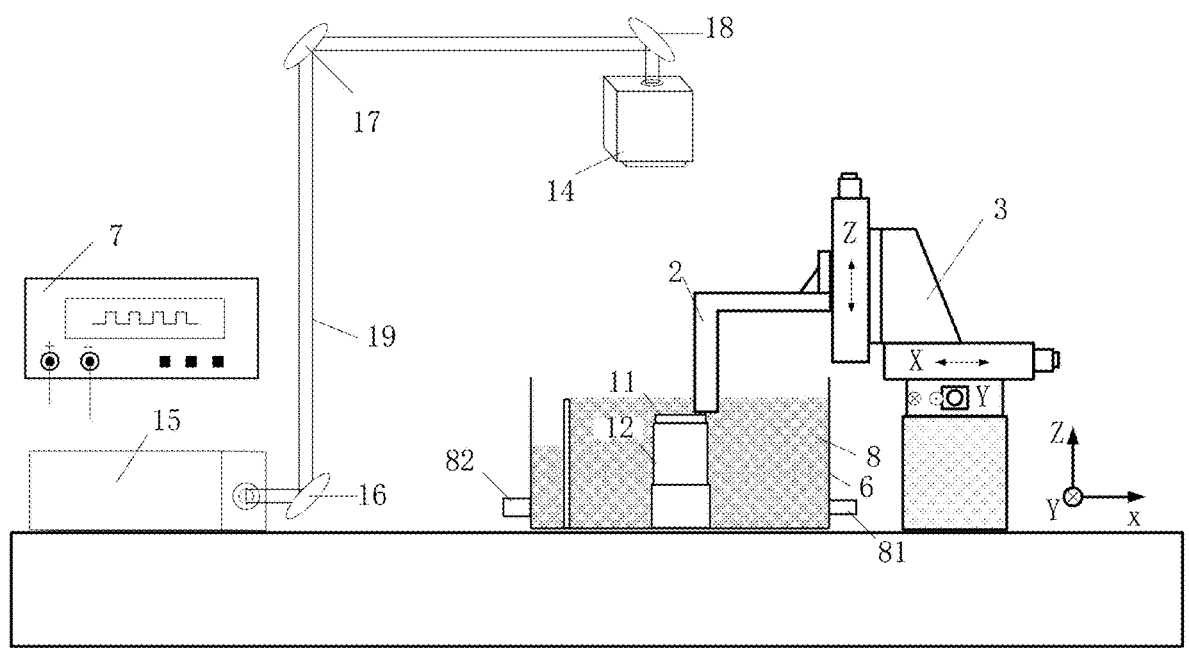
FIG. 6 shows a schematic diagram of the structure of the control system that achieves the cross-size micro-nano structure array of the invention.

Referring to FIG. 5 and FIG. 6, the invention provides a control system for preparing a cross-size micro-nano structure array. The control system is used to process a workpiece 11 arranged in an electrolyte 8. The control system includes a trimming wire electrode 10 set in the electrolyte 8, a power supply device 7 electrically connected to the trimming wire electrode 10 and the workpiece 11, an interference beam regulator 14 that provides multi-beam laser interference, a motion platform 3 that drives the trimming wire electrode 10 to move relative to the workpiece 11, and a computer (not shown) that controls the motion platform 3.

The power supply device 7 forms a loop with the trimming wire electrode 10 and the workpiece 11. In the loop, the power supply device 7 is an ultra-short pulse power supply 7, which can adjust parameters such as voltage amplitude, pulse period, pulse width, etc. The setting range of the above parameters can be set according to actual needs. Under the action of pulse voltage, the surface of the cathode connected to the negative electrode of the ultra-short pulse power supply 7 will have a transient effect of electric double layer charging and discharging, making the electrochemical machining accuracy reach sub-micron or even nanometers. Among them, the use of the trimming wire electrode 10 solves the problem of low output power of the existing ultrashort pulse power supply 7. The material of the trimming wire electrode 10 is metal. The metal can be tungsten, copper, etc., which are not listed here. The trimming wire electrode 10 is prepared by cutting a cylindrical metal wire online. Of course, the existing trimming wire electrode 10 can be directly selected without online preparation, and the selection can be made according to actual needs. The trimming wire electrode 10 is fixed on the motion platform 3, and the computer can control the motion platform 3 to move in three directions of XYZ, so as to move the trimming wire electrode 10 to the desired position, and the trimming wire electrode 10 is driven to reciprocate i in the three directions of XYZ. and the amplitude and frequency of the reciprocating movement can be set to obtain the desired movement mode.

In this control system, the electrolyte 8 is placed in the electrolyte tank 6, and the electrolyte tank 6 can be placed on a vertical lifting platform (not shown), so that the position of the electrolyte tank 6 can be adjusted in the height direction, and the electrolyte tank 6 can be located at the required position. The electrolyte tank 6 is provided with an inlet 81 and an outlet 82, and the inlet 81 and the outlet 82 are arranged on both sides of the electrolyte tank 6. In this way, it is convenient for the electrolyte 8 to circulate in the electrolyte tank 6 under the driving of a pump (not shown).

The interference beam adjuster 14 can output two-beam interference, three-beam interference, and four-beam interference. But not limited to it, the interference beam adjuster 14 can also provide other amounts of beam interference. In addition, the control system also includes a laser 15 to emit laser light, and a first total reflection mirror 16, a second total reflection mirror 17, and a third total reflection mirror 18 to reflect the laser. The ultraviolet laser light emitted by the laser 15 is lifted in the vertical direction by the first total reflection mirror 16 and the second total reflection mirror 17, and enters the third total reflection mirror 18, and then enters the interference beam adjuster 14. After the internal device of the interference beam adjuster 14, The laser is divided into multi-beam laser interference. The multi-beam laser interference output by the interference beam adjuster 14 are focused into a spot on the surface of the workpiece 11. The diameter of the spot is about 12-17 mm, and the energy density is 1.0-1.5 J/cm$^2$. The specific diameter and energy density of the spot can be adjusted according to actual needs.

The output mode of the interference beam adjuster 14 is changed by closing the diaphragm of the interference beam adjuster 14. And if the output mode of the interference beam adjuster 14 is set to double-beam interference, it is sufficient to close the two diaphragms arranged opposite to each other. The interference beam adjuster 14 is provided with a reflector inside, and the incident angle can be adjusted by adjusting the reflector. The interference beam adjuster 14 has an existing structure, and will not be repeated here.

The workpiece 11 is a metal material. The metal material can be stainless steel, titanium alloy, copper, etc., which are not listed here. The structure of the workpiece 11 can be a rectangular sheet, etc. The structure, shape and size of the workpiece 11 are not specifically limited here. The workpiece 11 can have any shape and size, which can be selected according to actual needs. The workpiece 11 is installed in the electrolyte tank 6 through the workpiece fixture 12.

Before the trimming wire electrode 10, the workpiece 11 and the corresponding fixtures are used, they can be cleaned. Specifically, they are each ultrasonically cleaned in alcohol and deionized water for 5 minutes to remove the oil and other impurities on the surface, and then use natural air to dry the deionized water remaining on the surface of the trimming wire electrode 10 and the workpiece 11. The specific cleaning steps are not specifically limited here, as long as the cleaning purpose can be achieved.

The above-mentioned control system is used to achieve a method for preparing a cross-size micro-nano structure array on the surface of the workpiece 11, and the method includes:

S1. Providing a workpiece 11 immersed in the electrolyte 8 as the first electrode, providing the trimming wire electrode 10 as the second electrode and set above the workpiece 11, providing an interference beam adjuster 14 and outputting multi-beam laser interference to irradiate the surface of the workpiece 11;

S2. The power supply between the first electrode and the second electrode forms a loop, and drives the trimming wire electrode 10 to reciprocate relative to the workpiece 11, and the workpiece 11 undergoes electrochemical dissolution or electrochemical deposition at the corresponding position of the trimming wire electrode 10, and form a micro-nano structure array.

Among them, the period of the obtained micro-nano structure array is 100 nm-10 μm, which achieves the rapid preparation of a large-area cross-size micro-nano structure array. The multi-beam laser interference is any one of two-beam interference, three-beam interference, and four-beam interference, or interference of other numbers of beams.

Set the parameters of the interference beam adjuster 14, such as the number of interference lasers, laser incident angle, laser energy, and spot size, so that the energy density of the light intensity region formed on the surface of the workpiece 11 by the multi-beam laser interference is between the laser weak ablation energy density and the strong ablation energy density of the workpiece 11. The light intensity region is the light spot formed by the multi-beam laser interference irradiation on the surface of the workpiece 11. The electrochemical parameters of the ultrashort pulse power supply 7 are set, such as voltage amplitude, pulse period, and pulse width, so that the workpiece 11 does not undergo electrochemical dissolution or electrochemical deposition. However, under the combined action of multi-beam laser interference irradiation and electrochemical parameters, due to the coupling of laser energy, electrochemical energy, and the charge/discharge transient effect of the electric double layer on the electrode surface, the workpiece 11 undergoes electrochemical dissolution or electrochemical deposition at the corresponding position of the trimming wire electrode 10. It should be noted that in the circuit formed by the trimming wire electrode 10 and the workpiece 11, when the trimming wire electrode 10 is used as the cathode and the workpiece 11 is used as the anode, an electrochemical dissolution reaction occurs; when the trimming wire electrode 10 is used as the anode and the workpiece 11 is used as the cathode When, an electrochemical deposition reaction occurs.

Since the strengthening effect of the laser only occurs in the irradiated area, the direction of electrochemical dissolution or electrochemical deposition remains along the normal direction of the workpiece 11, and the lateral corrosion or deposition of the material is suppressed, thereby preparing the anisotropic electrochemical dissolution or electrochemical deposition of the workpiece 11 material.

Figure 7:
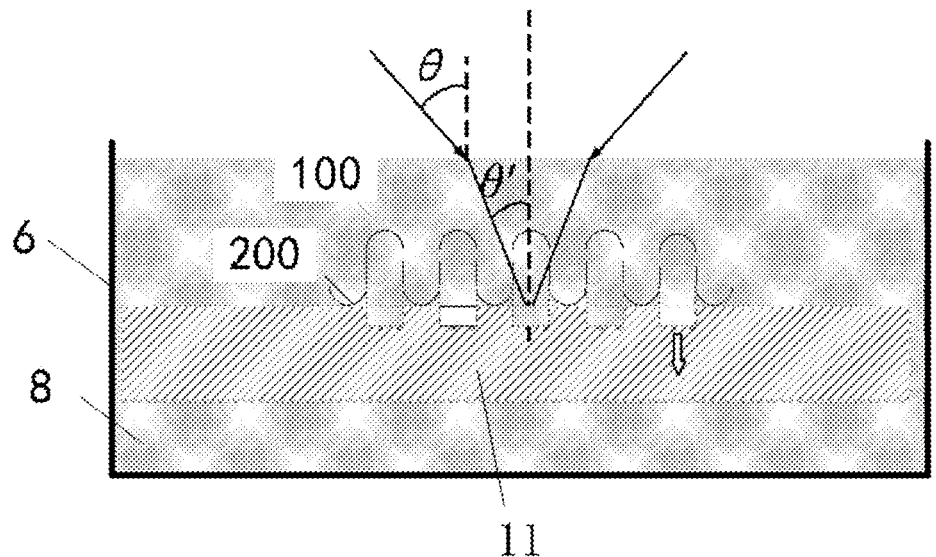
FIG. 7 shows a schematic diagram of light intensity distribution formed by multi-beam laser interference on the surface of the workpiece of the invention.
Figure 8:
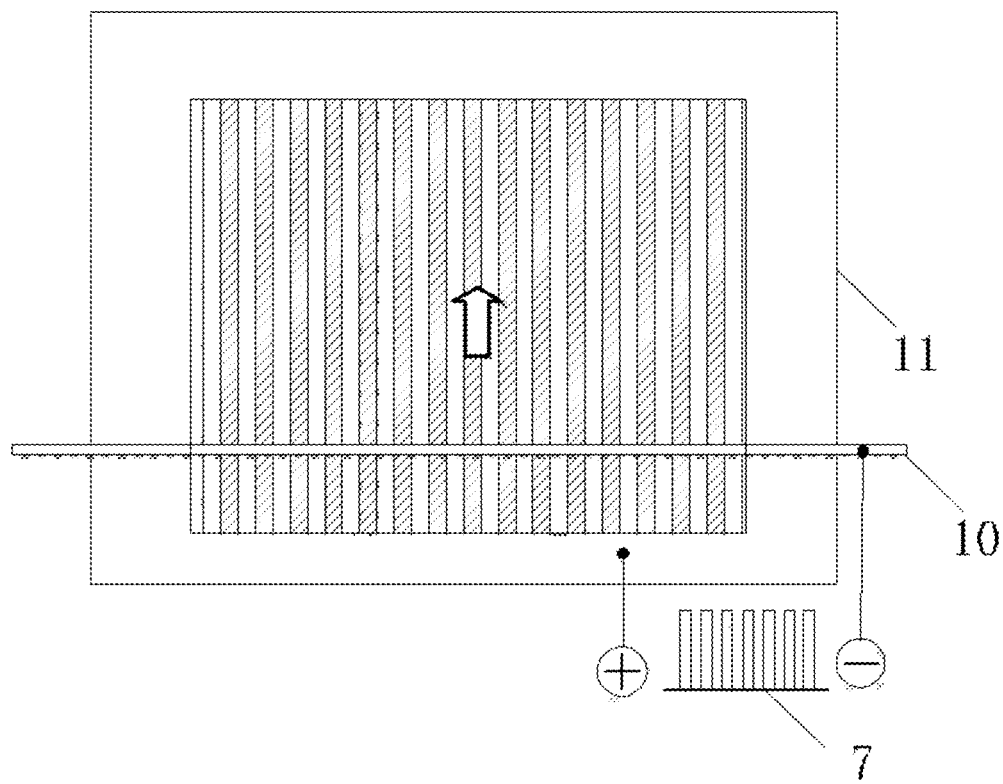
FIG. 8 shows a schematic diagram of the structure of the micro-nano structure array formed on the surface of the workpiece of the invention.
Figure 9:
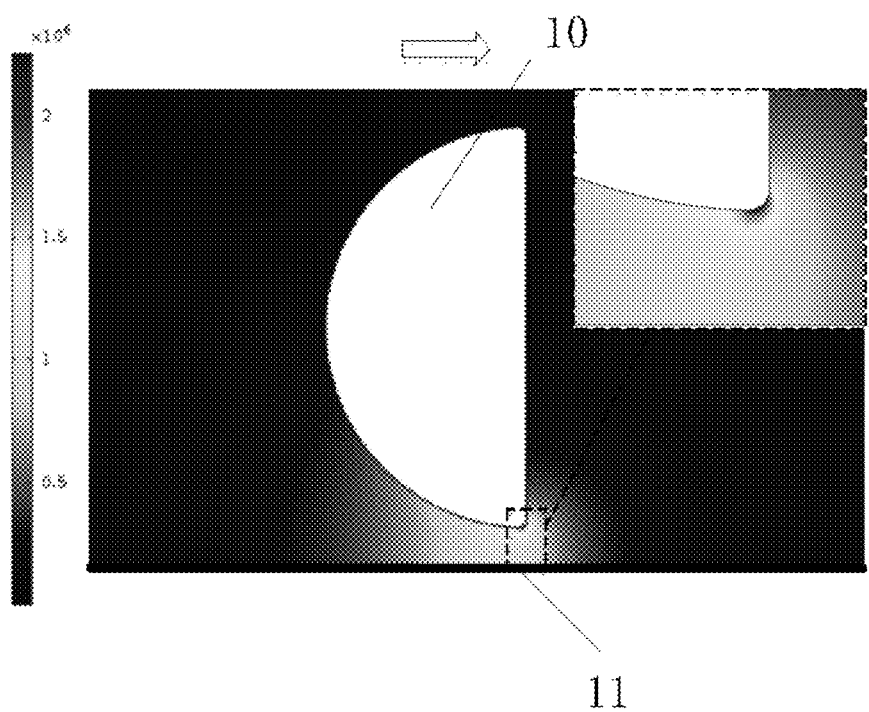
FIG. 9 shows a schematic diagram of the electric field strength between the workpiece and the trimming wire electrode of the invention.

Please refer to FIG. 7 to FIG. 9, the multi-beam laser interference forms the light intensity distribution of the strong light 100 and the weak light 200 alternately arranged on the surface of the workpiece 11. The material of the workpiece 11 in the area of the strong light 100 is electrochemically dissolved, while the material of the workpiece 11 in the area of the weak light 200 is basically insoluble. Under the reciprocating movement of the trimming wire electrode 1, a micro-nano structure array is formed on the surface of the workpiece 11.

Please refer to FIG. 1 to FIG. 4, the preparation method of the trimming wire electrode 10 is as follows: a metal wire 1 is provided as the wire electrode 1, and the wire electrode 1 is cut to a certain thickness along its axial direction by a micromachining method to form the trimming wire electrode 10. Specifically, the cross section of the metal wire 1 is a circular structure, and the diameter ranges is 50-100 μm. Install the metal wire 1 on the cathode fixture 2 with a certain tension force and immerse it in the electrolyte 8. Install the wire electrode 4 with a relatively small diameter under the metal wire 1, and drive the metal wire 1 to reciprocate relative to the wire electrode 4, and the wire electrode 4 is continuously fed, so that the metal wire 1 is cut to a certain thickness along its axial direction to form the trimming wire electrode 10.

The gap between the lower end surface of the trimming wire electrode 10 and the upper surface of the workpiece 11 is set to 1 unm as the initial machining gap. During occurrence of the electrochemical dissolution, the distance between the trimming wire electrode 10 and the workpiece 11 remains unchanged. During occurrence of the electrochemical deposition, the trimming wire electrode 10 moves away from the workpiece 11 at a constant speed v=0.01 μm. However, during the processing, the trimming wire electrode 10 reciprocates relative to the workpiece 11 in a horizontal direction, so that the material of the workpiece 11 is removed or deposited layer by layer. The processing accuracy of the micro-nano structure array is improved.

When electrochemical dissolution occurs on the surface of the workpiece 11, the distance between the trimming wire electrode 10 and the workpiece 11 remains unchanged, and the distance between the trimming wire electrode 10 and the workpiece 11 is the machining gap. As the material of the workpiece 11 is continuously dissolved in the light intensity area, the machining gap corresponding to the light intensity area gradually increases. When the machining gap increases to a certain extent, due to the increase of the solution resistance in the machining gap, the charging time constant of the electric double layer on the surface of the trimming wire electrode 10 increases, so that the potential cannot reach the decomposition potential of the material within the set pulse width time, the electrochemical dissolution stops, that is, when the micro-nano structure is processed to a certain depth, the electrochemical dissolution will automatically stop, realizing the high-precision preparation of the micro-nano structure array.

When electrochemical deposition occurs on the surface of the workpiece 11, after each reciprocating movement of the trimming wire electrode 10, it moves up a certain distance in the normal direction of the workpiece 11 and the distance is equal to the thickness of the electrochemically deposited metal layer in one reciprocating movement. A metal micro-nano structure array with a large aspect ratio can be formed. In addition, during the reciprocating movement of the trimming wire electrode 10, in the area corresponding to the trimming wire electrode 10, the laser can melt the surface of the deposited metal, thereby making the deposited layer more dense and improving the strength of the micro-nano structure.

With the above-mentioned processing mode, there are fewer transient electrochemical products, and the reciprocating movement of the trimming wire electrode 10 has a certain disturbing effect on the electrolyte in the machining gap. The electrolysis products in the machining area can be discharged in time without high-speed flow of the electrolyte or with a small flow pump, thereby improving the safety of the system and reducing the cost.

Regarding the method for preparing a cross-size micro-nano structure array on the surface of the workpiece 11, specific embodiments are described below:

The First Embodiment

Step 1: Online Preparation of the Trimming Wire Electrode 10

Please refer to FIG. 1 to FIG. 4, install the metal tungsten wire 1 with a diameter of 50 μm in the cathode fixture 2 with a tension of 2N, and install the cathode fixture 2 on the motion platform 3; Install the electrode fixture 5 equipped with a fine tungsten wire 4 with a diameter of 10 μm in the electrolyte tank 6; the positive electrode of the ultrashort pulse power supply 7 is connected with the metal tungsten wire 1, and the negative electrode is connected with the fine tungsten wire 4; The KOH electrolyte 8 with a concentration of 0.1 mol/L is placed in the electrolyte tank 6 and make the electrolyte 8 completely flood the metal tungsten wire 1; Set the output voltage amplitude (Z) of the ultra-short pulse power supply 7 to 5V, the pulse period (P) to 1 us, and the pulse width ($t_{on}$) to 100 ns. The initial machining gap 9 between the metal tungsten wire 1 and the fine tungsten wire 4 is set to 5 μm; the X axis in the motion platform 3 is set to a one-way motion, the motion speed is 0.1 μm/s, and the motion distance is 30 μm; The Y-axis in the motion platform 3 is reciprocating, with a motion amplitude of 30 mm and a frequency of 2 Hz; Turn on the ultra-short pulse power supply 7 to process the fine trimming wire electrode. After processing, a trimming wire electrode 10 with a steep side wall is formed.

Step 2: Laser Interference-Electrochemical Dissolution on the Surface of the Workpiece to Obtain a Micro-Nano Structure Array Please refer to FIG. 5 and FIG. 6, a 304 stainless steel sheet with a size of 10 mm*10 mm*2 mm is used as the workpiece 11, and it is installed in the electrolyte tank 6 through the workpiece fixture 12; The prepared trimming wire electrode 10 is moved to the top of the workpiece 11 through the moving platform 3, and the gap 13 between the trimming wire electrode 10 and the workpiece 11 is set to 1 μm; Fill the electrolyte tank 6 with a concentration of 0.1 mol/L HCl electrolyte 8 and driven by the submersible pump, the electrolyte 8 circulates in the electrolytic cell (not shown) and the electrolyte tank 6; Set the output mode of the interference beam adjuster 14 to double beam interference (just close the two diaphragms set opposite), The incident angle is 10° (the corresponding diaphragm mirror can be adjusted), the laser spot size is 15 mm, and the energy density is 1.3 J/cm$^2$; Connect the positive electrode of the ultrashort pulse power supply 7 to the workpiece 11, and the negative electrode to the trimming wire electrode 10; Set the output voltage of the ultra-short pulse power supply 7 to 4V, the pulse period to 1 us, and the pulse width ($t_{on}$) to 70 ns; Set the X-axis movement mode of the motion platform 3 to reciprocating, with an amplitude of 11 mm and a frequency of 1 Hz; Turn on the ultra-short pulse power supply 7, the laser 15 and the interference beam adjuster 14 to process the micro-nano structure, the processing time is 1.0 h, the surface of the workpiece 11 forms a periodic fringe micro-nano structure similar to the interference pattern, the micro-nano structure As shown in FIG. 8; the workpiece 11 is taken out from the workpiece fixture 12, and ultrasonically cleaned with alcohol for 5 minutes, to obtain a workpiece with a micro-nano structure array.

The Second Embodiment

Step 1: Online Preparation of the Trimming Wire Electrode 10

This step is the same as the preparation method in the first embodiment, and will not be repeated here.

Step 2: Laser Interference-Electrochemical Deposition is Performed on the Surface of the Workpiece 11 to Obtain a Micro-Nano Structure Array Take a copper sheet with a size of 10 mm*10 mm*2 mm as the workpiece 11, and install it in the electrolyte tank 6 through the workpiece fixture 12; The prepared trimming wire electrode 10 is moved to the top of the workpiece 11 through the moving platform 3, and the gap 13 between the trimming wire electrode 10 and the workpiece 11 is set to 1 μm; The electrolyte tank 6 is filled with the CuSO$_4$ electrolyte 8 with a concentration of 1.5 mol/L; The output mode of the interference beam regulator 14 is set to four-beam interference, The incident angle is 15°, the laser spot size is 15 mm, and the energy density is 1.1 J/cm$^2$; Connect the negative electrode of the ultrashort pulse power supply 7 to the workpiece 11, and the positive electrode to the trimming wire electrode 10, and set the output voltage to 3V, the pulse period to 1 us, and the pulse width ($t_{on}$) to 100 ns; Set the X-axis movement mode of the motion platform 3 to reciprocating, the amplitude is 11 mm, and the frequency is 1 Hz; Turn on the ultra-short pulse power supply 7, the laser 15 (not shown) and interference beam adjuster 14 for electrodeposition preparation of micro-nano structures. During the processing, the X-axis in the motion platform 3 reciprocates every 50 cycles, and the trimming wire electrode 10 moves up 0.5 μm under the drive of the Z axis in the motion platform 3. Set the total distance of the Z-axis in the motion platform 3 to move up to 50 μm, that is, the deposition thickness is 50 μm, and the surface of the workpiece 11 forms a micro-protrusion array structure; Take the workpiece 11 out of the workpiece fixture 12 and ultrasonically cleaned with alcohol for 5 minutes, a workpiece with a micro-nano structure array is obtained. It should be noted that the device used in this embodiment is exactly the same as that in the first embodiment, so the reference numbers are the same, see the attached drawings are also the same.

To Sum Up:

1. The method for preparing a cross-size micro-nano structure array of the invention uses multi-beam laser interference to assist electrochemical dissolution or electrochemical deposition, and controls physical fields such as temperature field and electric field in a specific area on the surface of the material by using interference light field to control the electrochemical dissolution or electrochemical deposition speed of the workpiece material in this area, and combined with the high localization characteristics of ultrashort pulse electrochemical machining, achieves the preparation of large-area metal micro-nano structure arrays without masks.
2. The fine trimming wire electrode is used as the tool electrode, which solves the problem of low output power of the existing ultrashort pulse power supply. During the machining process, the trimming wire electrode removes or electrochemically deposits the workpiece material layer by layer in a reciprocating scanning motion, thereby improving the machining accuracy of the micro-nano structure array.
3. During the machining process, since there are few instantaneous electrochemical products, and the reciprocating movement of the trimming wire electrode has a certain disturbing effect on the electrolyte in the machining gap, the electrolysis products in the machining area can be discharged in time without high-speed flow of the electrolyte. Thereby ensuring the stability of either electrochemical dissolution or electrochemical deposition, improving system safety and reducing costs.
4. During the machining processing, the laser energy acting on the surface of the micro-nano structure by multi-beam laser interference is relatively strong, while the energy acting on the side surface is relatively weak. Therefore, it can be anisotropic electrochemical dissolution or electrochemical deposition to obtain a micro-nano structure array with a large aspect ratio and can achieve anisotropic electrochemical dissolution or electrochemical deposition of metal materials.
5. During electrochemical deposition, due to the action of laser, the compactness and bonding strength of the deposited layer can be effectively improved, thereby increasing the rigidity of the micro-nano structure with a large aspect ratio.

The technical features of the above-mentioned embodiments can be combined arbitrarily. In order to make the description concise, all possible combinations of the various technical features in the above-mentioned embodiments are not described. However, as long as there is no contradiction in the combination of these technical features, all should be considered as the scope of this specification.

The above-mentioned embodiments only express several implementation modes of the invention, and the description is relatively specific and detailed, but it should not be understood as a limitation on the scope of the invention. It should be pointed out that for those of ordinary skill in the art, without departing from the concept of the invention, several modifications and improvements can be made, and these all fall within the protection scope of the invention. Therefore, the protection scope of the patent of the invention should be subject to the appended claims.

The invention claimed is:

1. A method for preparing a cross-size micro-nano structure array, which is characterized in that the method, includes:
   S1: Providing a workpiece immersed in an electrolyte as a first electrode, providing a trimming wire electrode as a second electrode and setting the trimming wire electrode above the workpiece, providing an interference beam adjuster and an outputting multi-beam laser interference to irradiate the surface of the workpiece;
   S2: a power supply between the first electrode and the second electrode forms a loop, and drives the trimming wire electrode to reciprocate relative to the workpiece, and the workpiece undergoes electrochemical dissolution or electrochemical deposition at the corresponding position of the trimming wire electrode, and form a micro-nano structure array.

2. The method for preparing a cross-size micro-nano structure array of claim 1, wherein the period of the micro-nano structure array is 100 nm-10 μm.

3. The method for preparing a cross-size micro-nano structure array of claim 1, wherein the multi-beam laser interference is any one of two-beam interference, three-beam interference, and four-beam interference.

4. The method for preparing a cross-size micro-nano structure array of claim 1, wherein the energy density of the light intensity region formed on the surface of the workpiece by the multi-beam laser interference is between the laser weak ablation energy density and the strong ablation energy density of the workpiece.

5. The method for preparing a cross-size micro-nano structure array of claim 1, wherein in the S2, a pulse power supply is used for power supply.

6. The method for preparing a cross-size micro-nano structure array of claim 5, wherein the electrochemical parameters of the pulse power supply are set so that the workpiece does not undergo electrochemical dissolution or electrochemical deposition; Under the multi-beam laser interference irradiation and the electrochemical parameters, the workpiece undergoes electrochemical dissolution or electrochemical deposition at the corresponding position of the trimming wire electrode.

7. The method for preparing a cross-size micro-nano structure array of claim 1, wherein the preparation method of the trimming wire electrode is: providing a metal wire as a wire electrode, and the wire electrode is cut to a certain thickness along its axial direction by a micro-machining method to form the trimming wire electrode.

8. The method for preparing a cross-size micro-nano structure array of claim 1, wherein the gap between the lower end surface of the trimming wire electrode and the upper surface of the workpiece is set to 1 μm as the initial machining gap, during the occurrence of the electrochemical dissolution, the distance between the trimming wire electrode and the workpiece remains unchanged, and during the occurrence of the electrochemical deposition, the trimming wire electrode moves far away from the workpiece at a constant speed v=0.01 μm/s.

9. A control system for preparing a cross-size micro-nano structure array, which is characterized in that in the control system, the method for preparing a cross-size micro-nano structure array according to claim 1 is used to process the workpiece set in the electrolyte, and the control system includes a trimming wire electrode set in the electrolyte, the power supply electrically connected to the trimming wire electrode and the workpiece, and the interference beam adjuster that provides multi-beam laser interference, and the power supply forms a loop with the trimming wire electrode and the workpiece.

10. The control system for preparing a cross-size micro-nano structure array of claim 9, wherein the control system further comprises a motion platform that drives the trimming wire electrode to move relative to the workpiece.

* * * * *